May 8, 1923.

A. L. POWELL 1,454,075

INTERNAL COMBUSTION ENGINE

Filed Dec. 24, 1920

Inventor

Alvah L. Powell

Patented May 8, 1923.

1,454,075

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

INTERNAL-COMBUSTION ENGINE.

Application filed December 24, 1920. Serial No. 433,035.

*To all whom it may concern:*

Be it known that I, ALVAH L. POWELL, a citizen of the United States, residing at Miles City, in the county of Custer and State of Montana, have invented certain new and useful Improvements in Internal-Combustion Engines, of which the following is a specification.

My invention relates to improvements in internal combustion engines in which I provide for concentrating the piston power at an advantageous part of the crank circle, for distributing the piston pressure more uniformly, and for increasing the thermal efficiency as a whole by absorbing an amount of heat which would otherwise be lost.

In the accompanying drawings Fig. 1 is a vertical elevation, in section, showing an application of my improvement to a two cycle engine.

Figure 1:
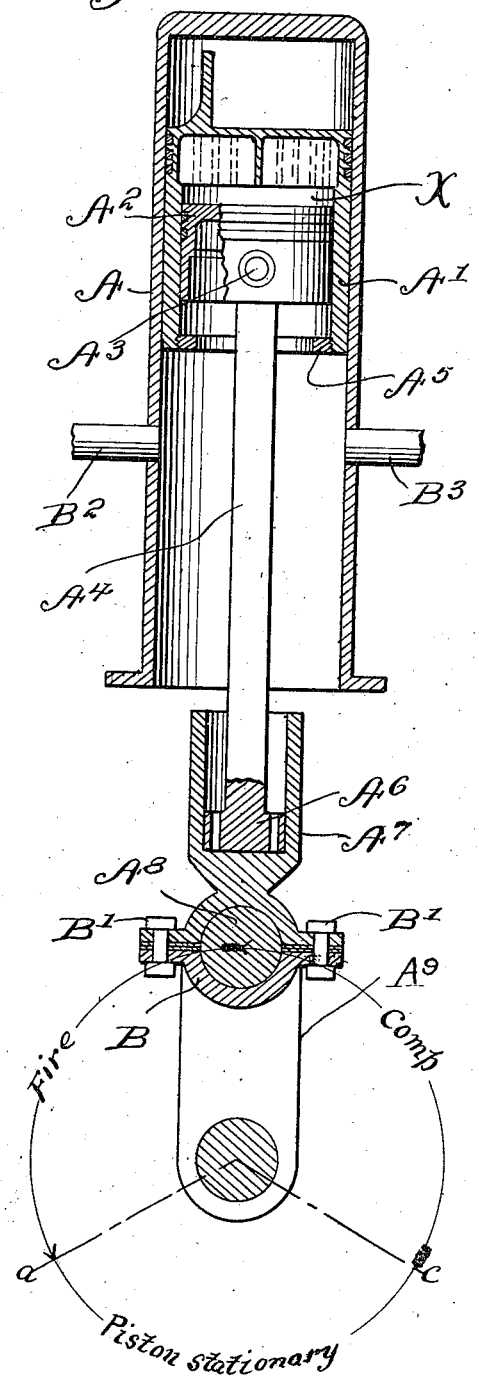

In Fig. 1 a piston $A^1$, in a cylinder $A$ is slidably fitted in the latter. The piston $A^1$ is counterbored and a second piston, $A^2$, fitted to it in slidable relation. In piston $A^2$ is a wrist pin, $A^3$, on which swings a piston rod, $A^4$. In the lower section of $A^1$ a ring is threaded in, $A^5$, to serve as a retaining means for piston $A^1$. On lower end of $A^4$ there is a minor piston, $A^6$, in which are small air holes, as shown. $A^6$ fits in a cylindrical space in a member $A^7$, that is pivoted on wrist pin $A^8$, on engine crank $A^9$, and secured thereto by the cap $B$ and bolts $B^1$. I also show inlet and exhaust ports at $B^2$, $B^3$, to which proper valves can be attached for a two cycle engine.

In the position shown in Fig. 1 the main piston is at top stroke. On outstroke ignition occurs and force is applied to piston $A^1$. As $A^1$ is loose on piston $A^2$ the first effect of this is to reduce the space between said pistons, at X, the pressure in this space rising until it equals that of the explosion. Both pistons then move on together. It will be seen, by examining drawing, that $A^6$ will be bearing on the bottom of the cylindrical passage in which it slides, and the pressure will cause the crank $A^9$ to begin rotation. As $A^1$ moves out the pressure in the combustion chamber will fall, but this will lead to expansion of the air in X and a retarding effect on $A^1$ will take place. This will be balanced by the equalization of pressure, the pressure in combustion chamber and X automatically adjusting themselves. In the early part of movement of $A^1$ the wrist pin $A^8$ will be passing through a part of the crank circle where the angularity of motion with reference to center line of engine will not be favorable to high mechanical efficiency, but as it advances the effectiveness of thrust increases, and the additional push imparted by the expansion in X acts under conditions conversive to high efficiency. The compressed air in the space X is further increased in pressure by adsorption of heat from piston and cylinder walls, and this added energy is given up to the crank. The chamber X is assumed to have an original charge of air at atmospheric pressure, introduced at the time of assembling the engine.

On reaching the point $a$ (Fig. 1) the crank continues to advance but the pistons remain stationary. The ports indicated at $B^2$, $B^3$, are uncovered as the piston $A^1$ reaches the position described, and exhaust takes place through $B^3$. When pressure has fallen to a point equaling, or lower than the air pressure in crank case (not shown), air enters the cylinder, with a proper proportion of fuel from any convenient source. On the crank circle, Fig. 1, the opening of exhaust is indicated at "$a$" and its closing at "$c$." This I secure by a difference in stroke of piston $A^1$ in reference to crank stroke, the latter being greater than the former. On reaching $a$ the effect of this difference becomes an operative factor, the crank drawing away from the minor piston $A^6$ which then has a position in the upper part of the cylindrical passage in which it moves. This action continues from $a$ to $c$, where a reverse effect begins. Pressure develops under piston $A^6$, the air beneath it being compressed and it reacts on piston $A^2$ which, in turn, moves piston $A^1$ by reason of the air compressed between them. I cause small relief holes to be drilled through piston $A^6$ by which the compression may relieve itself, this also serving as a cushion to prevent noise or shock.

Figure 2:
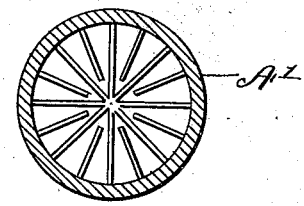
Fig. 2 is a plan of the piston, showing the arrangement of baffle plates to absorb heat.

In Fig. 2 the baffle plate or sections on $A^1$ are shown. This increases the surface, the heat being more quickly taken up by the compressed air in X.

Figure 3:
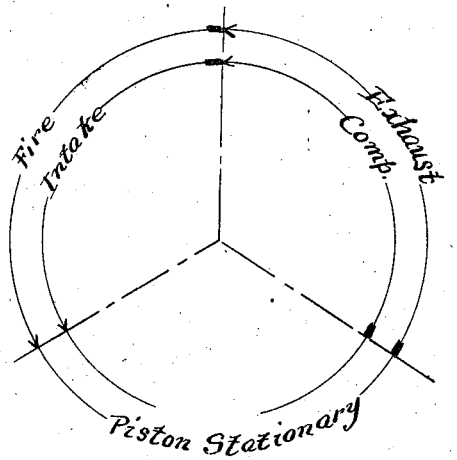
Fig. 3 is a diagram of the operation of an engine of the four cycle type.

In Fig. 3 the diagram shows the operation in case of a four cycle engine.

In this way I obtain a structure relatively simple and of high mechanical and thermal efficiency.

What I believe is new and ask to have protected by Letters Patent, is—

1. In an internal combustion engine, the combination of a power cylinder, a primary piston located therein and a secondary piston, the said secondary piston slidable in the said primary piston, an air space between said pistons, heat absorption surfaces in the said primary piston for absorbing heat from the explosive gases in the power cylinder; a piston rod, a crank, a power shaft; connecting means between said secondary piston and said piston rod, crank and power shaft, whereby the force exerted against the said primary piston is transmitted to the said crank in the form of power and to the air space in the form of heat, the movement of the crank being maintained thereby at the points of its stroke most favorable to power reception, by the expansion of the air between said pistons, substantially as described.

2. In an internal combustion engine, a power cylinder, a primary piston slidable in said cylinder, a secondary piston slidable in said primary piston, an air space between said pistons, heat absorbing surfaces in said air space, a piston rod, a minor piston on said piston rod, means for connecting said piston rod to said secondary piston; a power crank, a power shaft, a cylindrical chamber forming part of said power crank, means for moving said power crank by said piston rod and said minor piston, means for alternately compressing and discharging air from said cylindrical chamber by the action of the said minor piston, means for rotating said power crank by the force developed in the said power cylinder, and means for maintaining the movement of said power crank while it is traveling through that part of crank circle of greatest mechanical effect, by the expansion of the air in said air space between said primary and secondary pistons, substantially as described.

In testimony whereof I affix my signature.

ALVAH L. POWELL.